Oct. 21, 1941.　　　E. P. BULLARD, 3D　　　2,259,948
INDEXING MECHANISM FOR MACHINE TOOLS
Filed May 18, 1939　　　3 Sheets-Sheet 1

INVENTOR.
Edward P. Bullard, III
BY Paul M. Geist
ATTORNEY.

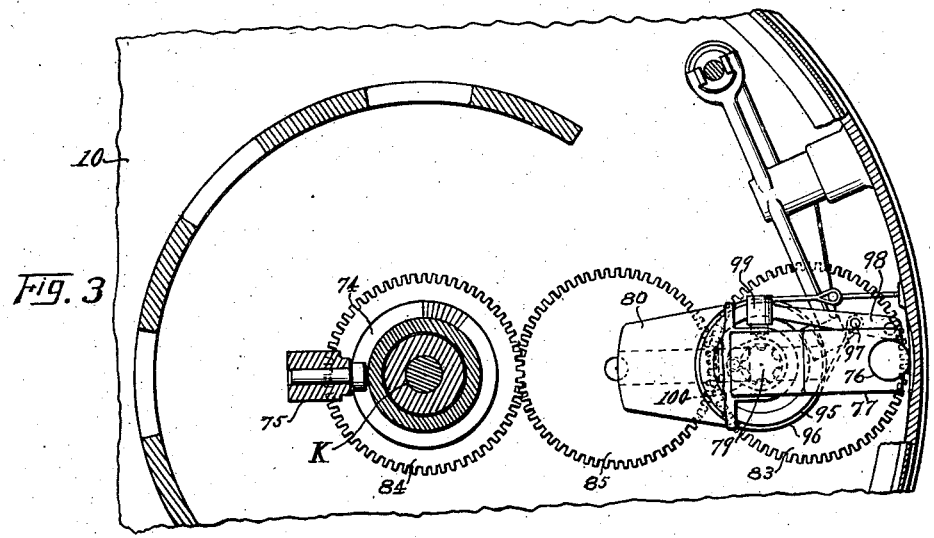

Oct. 21, 1941.  E. P. BULLARD, 3D  2,259,948
INDEXING MECHANISM FOR MACHINE TOOLS
Filed May 18, 1939   3 Sheets-Sheet 3
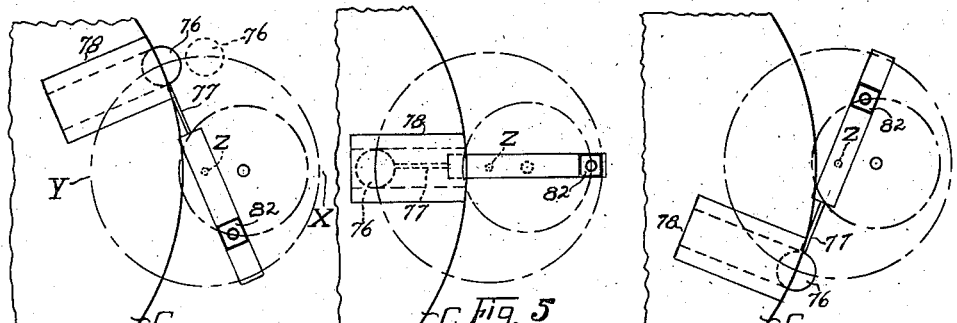
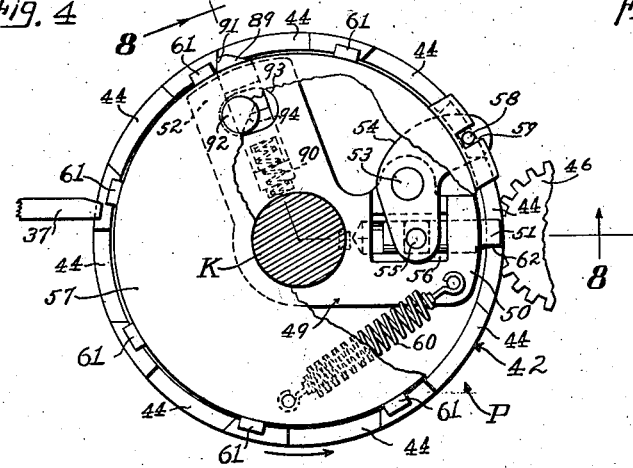
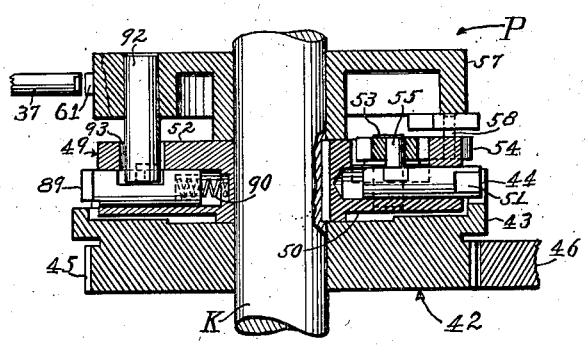
INVENTOR.
EDWARD P. BULLARD, III
BY Paul M. Geist
ATTORNEY.

Patented Oct. 21, 1941

2,259,948

UNITED STATES PATENT OFFICE 2,259,948

INDEXING MECHANISM FOR MACHINE TOOLS

Edward P. Bullard, III, Fairfield, Conn., assignor to The Bullard Company, a corporation of Connecticut Application May 18, 1939, Serial No. 274,345

30 Claims. (Cl. 29—50)

This invention relates to machine tools of the type in which a work-supporting carrier is periodically indexed through a predetermined number of degrees about an axis to present a plurality of work-pieces to successive stations where various operations are performed thereon, and particularly to the mechanism employed for indexing the carrier.

While the principles of this invention may be applied to any machine tool in which a member is adapted to be periodically indexed, they will be described as applied to the type of machine tool disclosed in Patent 2,086,852 granted to E. P. Bullard et al. on July 13, 1937.

Machine tools of the type disclosed in the above-referred-to patent usually include a standard about which a spindle-supporting carrier is adapted to be indexed. The spindles are positively driven by inter-meshing gears at speeds which may be different for different spindles depending upon the operations to be performed on the work at successive stations about the machine. When the carrier is to be indexed, these inter-meshing gears are disengaged with the result that the speed of the spindles decreases, or may be different from that of a succeeding positive drive. Upon completion of the indexing movement and prior to re-establishing the positive drive, an impositive drive is employed to synchronize the speed of the spindle gears with that of the constantly rotating positive driving gears. A common indexing shaft is usually employed to control the mechanism for synchronizing the speed of the spindle gears with that of the positive driving means, as well as to positively drive the carrier indexing mechanism. This common indexing shaft rotates through a single revolution during a complete indexing movement of the carrier. Only a portion of its revolution however, is necessary for indexing the carrier, and only a portion of its revolution is required to control the synchronizing mechanism.

Due to the mass of the carrier, the spindles and the work that is supported by the spindles, the speed at which the carrier can be indexed is definitely limited. However, it has been found that the speed of rotation of the common indexing shaft necessary to control the synchronizing mechanism may be much greater than the speed at which said shaft must be rotated to index the carrier without overtaxing the indexing mechanism. In other words, the speed of rotation of the common shaft to index the carrier properly provides a much greater time interval than is necessary for the operation of the synchronizing mechanism. Consequently, during each indexing movement considerable time is lost, thereby materially limiting the speed at which such machines can perform.

Certain prior known machines employ a crank member, for indexing the carrier, which rotates at a constant speed. The crank contacts means on the carrier and imparts a "Geneva" type motion thereto subjecting the carrier to a substantially variable acceleration. The carrier must, of course, be accelerated and decelerated during its indexing movement. The manner in which this acceleration varies directly affects the operation of the machine tool since the force necessary to overcome the changing acceleration is the product of the mass of the carrier and its acceleration at a given instant.

The point of contact between the crank pin of the constant velocity single crank and the carrier initially approaches and finally recedes from the center of the carrier, while at the same time the tangential velocity imparted to the carrier initially increases and finally decreases. Such a condition produces substantially a maximum variation in the acceleration of the carrier during an indexing movement and consequently causes excessive stressing of the machine parts.

Machines of the above-described type require a readily engageable and disengageable positive drive between the common indexing shaft and its driving means. Accordingly, a positive-action clutch is commonly employed for this purpose in which a mechanically-operated plunger fixed to the common indexing shaft is projected into a slot formed in the rim of a constantly rotating clutch element. The slots of such a clutch must be of much greater length than the width of the plunger in order to enable the plunger (a fixed element) to properly engage with the clutch element (a rotating element). Since the spindle-supporting carrier is accelerated during the first half, and decelerated during the last half of its indexing movement, this prior-known type of clutch prevents the carrier from beginning its deceleration until after the lost motion of the clutch has been taken up. Consequently, the carrier's travel is abruptly interrupted, causing it to slam, and excessively stressing the parts of the machine, thereby detrimentally affecting its life and operation.

An object of this invention is to provide a machine tool of the above-described type capable of overcoming these and other difficulties.

Other objects of the invention include the provision of a machine tool in which the work-supporting carrier may be indexed with greater ease and less effort than prior-known machine tools; the provision of a multiple spindle machine tool in which the carrier may be indexed and the drive for the spindles may be changed in a much shorter time interval than was heretofore possible; the provision of such a machine tool in which the speed of rotation of the spindles may be synchronized with that of a positive continuously operating driving means in a much shorter time interval than was heretofore possible; the provision of such a machine tool in which a common drive shaft is employed to control the spindle drive-changing mechanism, or the spindle synchronizing mechanism and for driving the carrier indexing mechanism; the provision of such a machine tool in which the common indexing shaft is rotated fast enough to effect a spindle-drive change, or a synchronization of the spindle speed with that of a continuously operating driving means in minimum time, and in which means is provided between the common indexing shaft and the indexing mechanism for decreasing the speed at which said shaft drives the indexing mechanism; the provision of such a machine tool in which the common indexing shaft may be readily connected to and disconnected from a rotating positive-action clutch element, which connection is effective in either direction and contains no back-lash; and the provision of such a machine tool in which the kinetic energy of the rotating spindle carrier may be effectively absorbed during an indexing movement.

The above and other objects and novel features of the invention will become apparent from a consideration of the accompanying specification and the attached drawings, in which, Figure 1 is a skeleton elevation view of a multiple spindle machine tool embodying the principles of this invention, certain elements having been omitted for clarity.

Fig. 2 is a sectional elevation view of part of the machine shown in Fig. 1, disclosing the novel combination of certain of the elements which form the present invention;

Fig. 3 is a sectional plan view taken substantially along the line 3—3 of Fig. 2;

Figs. 4, 5 and 6 are diagrammatic views illustrating three positions of the compound or double crank employed to index the carrier about its central axis;

Fig. 7 is an enlarged plan view taken substantially along line 7—7 of Fig. 1, showing the positive-action clutch mechanism; and Fig. 8 is a sectional elevation view taken substantially along line 8—8 of Fig. 7.

Figure 1:
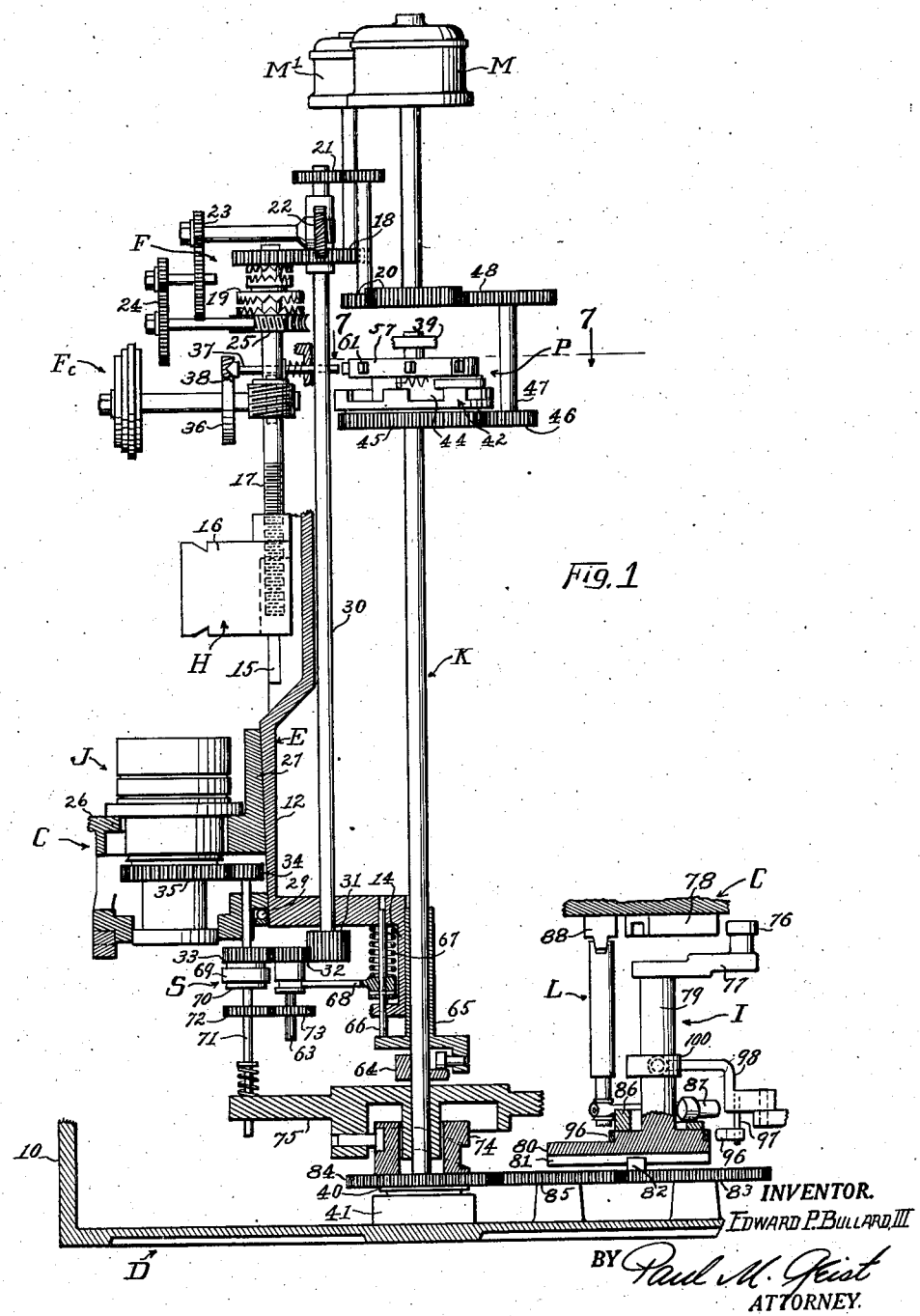

Referring to Figs. 1 and 2, the principles of this invention are shown as applied to a vertical multiple-spindle lathe comprising a base D that supports a vertically-disposed standard E upon which is mounted a plurality of tool heads H (only one of which is shown). The tool heads H are adapted to be reciprocated vertically at various speeds by motors M and M¹, and a feed works F associated with each head.

A spindle-supporting carrier C is journaled on the standard E and is adapted to support a plurality of work-supporting spindles J spaced about its central axis. The spindles J are adapted to be driven by a positive drive while a working operation is being performed, and to be disengaged from said positive drive when the carrier C is to be moved about its central axis through an indexing movement.

The carrier C is indexed by a compound or double crank mechanism I, which coacts with means on the carrier C to impart a modified "Geneva" type of movement to the carrier C and to move it through a predetermined number of degrees to position the spindles J under different tool-heads H. After the spindles J are disconnected from the positive drive, and during the indexing of the carrier C, their speed of rotation decreases, or may be different from that of the succeeding positive drive. Upon completion of the indexing movement of carrier C the spindles J must be re-connected to the continuously-rotating positive drive. Accordingly, a synchronizing mechanism S is provided for imparting to the spindles J a speed of rotation corresponding to that of the positive drive so that their respective gears may be inter-meshed without clashing.

A vertically-disposed centrally-located shaft K, adapted to be rotated through a single revolution during each indexing operation of the carrier C controls the synchronizing mechanism S and drives the indexing mechanism I. The shaft K is adapted to be driven by the motor M and to be connected to and disconnected therefrom by a feed works control Fc and a positive-action clutch P. One continuous revolution of the shaft K causes the positive drive for the spindles J to be disengaged; the carrier C to be unlocked by lowering a locking pin L; the carrier C to be indexed about its central axis by the indexing mechanism I; the locking pin L to be re-engaged; the speed of rotation of the spindles J to be raised to that of the positive drive by the synchronizing mechanism S; and the positive drive to be re-engaged with the spindles J, all in the order named.

Referring to Figs. 1 and 2, the base D of the machine comprises a substantially cylindrical member 10, in the center of which is located an elevated platform 11 that forms a support for the standard E as well as a support for the driving mechanism for the spindles J.

The vertically disposed standard E comprises a substantially tubular shell 12, the lower end 13 of which seats in the platform 11 of the base D. Above the lower end 13, the shell 12 is reduced to form a neck portion 14, and immediately thereabove, it assumes a diameter substantially equal to that of the lower end 13. This construction provides space within which the synchronizing mechanism S and the positive drive mechanism for the spindles J may be located.

Referring to Fig. 1, the substantially tubular standard E is adapted to support the tool heads H (only one of which is shown) for vertical reciprocable movement. The upper portion of standard E in the present instance is of octagonal cross-section thereby providing seven flat surfaces within which guideways 15 for seven separate tool heads H may be provided, and an eighth flat surface on which no head is mounted, thereby rendering one of the spindles J free for a work-loading station.

The tool head H comprises a body 16 into which an operating shaft 17 is threaded. The shaft 17 is adapted to be rotated in either direction and at different speeds by the motors M and M¹ and the feed works F. It is to be understood that each head H is connected to the motors M and M¹ through its own individual feed-works F. Inasmuch as the feed-works for each head H is identical, only one has been illustrated, and since the feed-works forms no part of the invention, its description will only be complete to the extent of showing its relation to the present invention. A more complete description of the feed works F may be had from Patent #2,086,846 granted July 13, 1937, in the name of E. C. Bullard.

Referring to Fig. 1, the motor M¹ is a reversing motor adapted to rotate the shaft 17 in either direction at a relatively high speed for bringing the tool head H rapidly down into feeding position and for rapidly retracting said tool head after the machining operation on the work has been completed. The motor M¹ drives the shaft 17 through the gear train 18 and through the clutch member 19 that is splined to the shaft 17. Motor M drives the shaft 17 in only one direction through the gear trains 20, 21, 22, 23, 24, 25, and the clutch 19. Movement of the clutch 19 upwardly causes a rapid traverse of the head H in a direction depending upon that in which motor M¹ is rotating; while movement of clutch 19 downwardly feeds a tool secured in head H into engagement with work that is supported by the spindles J on the carrier C.

Referring to Fig. 2, the carrier C comprises a substantially annular-shaped member 26 having a bearing portion 27 adapted to be journaled on the lower end of the standard E, and a thrust-bearing portion 28 adapted to bear against an anti-friction thrust bearing 29 permanently secured to the lower end of the standard E. The spindles J are journaled in the carrier C and located about its central axis. Referring to Figs. 1 and 2, the motor M feeds the head H during a cutting operation, and such feeding should bear a definite relation to the rate at which the spindles J are driven. Accordingly, the motor M, through the gear trains 20 and 21, drives shafts 30 (Fig. 2) which transmits the power from the motor to the spindles J. Shafts 30, one for each spindle J except the spindle located at the loading station, are disposed about the gear train 20 so that each may be rotated by the motor M. Their rotation is transmitted to the spindles J through identical gear trains including gears 31, 32, 33, 34 and 35, the last of which is fixed to the respective spindles J. By selecting the proper gears in the train 21, it is apparent that each of the shafts 30 as well as the spindles J may be driven at any pre-determined speed independently of every other.

Referring again to Fig. 1, the operation, setting, and control of the head H is automatically attained by the feed-works control Fc. This mechanism likewise forms no part of the present invention, and its description will also be limited to merely an understanding of the present invention. A more specific description of the control Fc may be found in Patent #2,086,852, granted July 13, 1937, to E. P. Bullard, et al. The mechanism Fc may be set in advance to control the operation of its respective head H. When the head H has been retracted from the work, following the completion of a working operation, a disc 36 associated with the control Fc will assume a position where a plunger 37 will coact with a notch 38 in the surface of said disc. Such action of the plunger releases means to effect engagement of the shaft K with the motor M through the positive-action clutch P.

Referring to Figs. 1 and 2, the shaft K is disposed vertically along the central axis of the standard E. It is journaled at its upper end in a bearing 39, while its lower end is provided with a thrust plate 40 that is supported by a thrust bearing 41 formed on the base D. Referring to Figs. 1, 7 and 8, the clutch P comprises an element 42 provided with an upper flanged rim 43 having wide slots 44 disposed about its periphery and a lower gear portion 45. The element 42 is journaled on the shaft K, and its gear portion 45 meshes with a gear 46 fixed to one end of a shaft 47 (Fig. 1). The shaft 47 is driven by the motor M through one gear of the train 20 and a gear 48 fixed to the end of shaft 47 opposite that which supports gear 46. Accordingly, clutch element 42 continuously rotates so long as the motor M is energized. As previously stated, the shaft K is adapted to be rotated through a single revolution for each indexing movement of the carrier C, and therefore must be readily connected to and disconnected from the clutch element 42. Referring to Figs. 7 and 8, a bracket 49 is keyed to shaft K and its one arm 50 is bored to receive a radially-reciprocable plunger 51. The other arm 52 of the bracket 49 is likewise bored to receive another radially-reciprocable plunger for a purpose which will be described later. The arm 50 of bracket 49 also supports a pivot pin 53 on which a bell-crank 54 is pivoted. One arm of the bell crank 54 is connected to the plunger 51 by a pin 55 that extends through a cut out portion 56 of arm 50. The other arm of the bell-crank 54 is connected to a drum 57 by a pin 58 which fits into a slot 59 of said drum. The drum 57 is journaled on the shaft K and is connected to the arm 50 of bracket 49 by a tension spring 60. The drum 57 is provided with lugs 61 spaced about its periphery, each of which is adapted to be engaged by one of the plungers 37 of the respective feed-works control mechanisms Fc (Fig. 1).

During a working operation, the plungers 37 are adapted to engage the lugs 61 and to hold the drum 57 in a position turned clockwise from that in which it is shown in Fig. 7, so that spring 60 is under tension. When the last of the heads H has been retracted from the work, and the last plunger 37 withdrawn from engagement with its lug 61 on the drum 57, the spring 60 contracts, rotating drum 57 in a counterclockwise direction relative to bracket 49. Such relative movement between drum 57 and bracket 49 causes slot 59 to move pin 58 and consequently to turn bell-crank 54 in a counterclockwise direction about its pin 53. This movement of bell-crank 54 forces the plunger 51 radially outwardly into one of the slots 44 of the clutch element 42. Inasmuch as the plunger 51 is fixed to the non-rotating shaft K and is moved into engagement with the rotating element 42, the slots 44 must be much longer than the width of the plunger 51 in order to provide ample time for the plunger to get into driving position before a trailing wall 62 of a slot 44 engages it. Near the end of a single revolution of shaft K, means (not shown) causes the disc 36 (Fig. 1) of the control Fc to start rotating again so that the plunger 37 is forced into the path of the lugs 61 on the drum 57, thereby preventing continued rotation of said drum. As the shaft K and bracket 49 continue to rotate in a counter-clockwise direction (Fig. 7), spring 60 is tensioned. Since pin 58 remains in a fixed position, being engaged by the walls of slot 59 of drum 57, and pivot 53 moves with the bracket 49, the arm of the bell-crank 54 which is connected to the plunger 51 will move in a clockwise direction about pivot 53 thereby withdrawing the plunger 51 from the slot 44 in the clutch element 42.

Referring to Fig. 2, the gears 32 of the gear trains which form the positive drive for the spindles J are splined to shafts 63, so that said gears may be raised out of, or lowered into mesh with gears 33 while at all times remaining in mesh with gears 31. Movement of the gears 32 is controlled by the action of a cam 64 on shaft K which cam is adapted to raise a sleeve 65 that is slidably mounted on said shaft. The sleeve 65 supports vertically-movable rods 66 which are urged downwardly by springs 67 bearing against arms 68,—the latter being pinned to rods 66. The arms 68 engage extended hub portions of gears 32 so that vertically upward movement of sleeve 65 by the cam 64 causes the positive drive between shafts 30 and spindles J to be disengaged. The cam 64 is positioned on the shaft K so that when the latter begins to turn during its single revolution, the gears 32 are immediately raised out of mesh with gears 33.

When it is desired to re-engage gears 32 with the gears 33, it is necessary to synchronize the speed of gears 33 with that of gears 32 in order to prevent gear clash. Accordingly, each gear 33 is provided with an integral skirt 69 which forms one element of a friction clutch. The other element 70 of the friction clutch is attached to one end of a synchronizing drive shaft 71 that is splined to and adapted to slide in a hubbed gear 72 (Fig. 2). The hubbed gear 72 is journaled in the platform 11 of the base D, and is driven by a gear 73 keyed to the shaft 63. Therefore, by selecting gears of the proper size and raising shaft 71 far enough to effect engagement between the clutch element 70 and the skirt portion 69, the speed of gears 33 may be synchronized with that of the gears 32.

Upward movement of the shafts 71 is controlled by the rotation of shaft K through a cam 74 fixed thereto. The cam 74 is adapted to raise and lower a spider 75 journaled on the shaft K. The outer ends of the arms of the spider 75 are resiliently connected to the lower ends of synchronizing drive shafts 71.

The cams 64 and 74 are positioned about shaft K so that upon its revolving through a single revolution, the positive drive for the spindles J is disengaged; then after a predetermined time interval, the speed of gears 33 is synchronized with that of gears 32 and the positive drive is re-established.

The carrier C is adapted to be moved through a predetermined number of degrees about its central axis during an indexing movement which indexing occurs during, and is controlled by, the rotation of shaft K. The carrier C is indexed by a rotatable crank pin 76 of a crank arm 77 forming part of the mechanism I. The crank pin 76 is adapted to contact inverted channel-shaped shoes 78 on the under surface of the carrier C to impart a modified "Geneva" type motion to the carrier. Referring to Figs. 4, 5 and 6, the crank pin 76 initially and finally engages the shoe 78 on a tangent with the path of said pin. Therefore, the angular velocity imparted to the carrier C by the pin 76 is initially zero (Fig. 4) gradually increasing to a maximum (Fig. 5), and thence decreasing to zero as the pin 76 leaves the shoe 78 (Fig. 6).

At a specific timed relation with the indexing of carrier C, the above-described mechanism S must synchronize the speed of the spindles J with that of the positive drive so that the spindles may be re-engaged with said drive. These two functions must be maintained in a definite timed relation and inasmuch as the shaft K is adapted to control both, the ratio between the rotation of shaft K and that of the crank pin 76 must be 1:1, otherwise the timed relation of these two functions will vary during successive indexing operations. It has been found that if the shaft K is rotated rapidly enough to effect synchronization of the spindle speed with that of the positive drive in a minimum time, the shaft K will drive the crank pin 76 at too great a speed for proper and safe indexing of the carrier C. Accordingly, some means must be provided between the shaft K and the crank pin 76 for decreasing the speed at which said crank pin is driven by said shaft during at least a portion of its revolution and still maintain between said shaft and said crank pin a 1:1 ratio of rotation. The provision of the indexing mechanism I between the shaft K and the crank pin 76 accomplishes this result. By way of illustration, it is represented as a compound indexing crank adapted to be rotated at a variable speed through a single revolution during an indexing movement.

Referring to Fig. 2, the indexing mechanism I comprises the crank arm 77 fixed to one end of a crank shaft 79 that rotates about an axis Z. The opposite end of shaft 79 rigidly supports an arm 80 located 180° away from the crank arm 77. The under surface of arm 80 includes a groove 81 which forms a cross-head connection with a block 82 mounted on a gear 83, which gear is adapted to be rotated at a constant velocity by shaft K and at a 1:1 ratio therewith through gears 84 and 85.

Referring again to Figs. 4, 5 and 6, it is apparent that the angular velocity of the crank arm 77, and in a like manner the tangential velocity of the crank pin 76, varies between a maximum at a point X and a minimum at point Y (Fig. 4) depending upon the distance between the block 82 and the center Z about which the compound crank rotates. That is, the angular velocity of crank arm 77 varies inversely as the distance between block 82 and the axis Z. As stated before, only a portion of the revolution of crank pin 76 is required to index the carrier C through an indexing movement. Therefore, by selecting the low-velocity portion of the travel of crank pin 76 for indexing the carrier C, the rotation of shaft K, which drives the crank pin 76, may be substantially increased and still drive the carrier within a safe speed. Furthermore, the above selection enables the mechanism S to be operated during the high-velocity portion of the travel of crank pin 76 and therefore within a minimum time interval. Additionally the above construction provides a 1:1 ratio of rotation between the shaft K and the crank pin 76. This variable-speed indexing mechanism I produces a smoother indexing action than can be obtained with the constant speed single crank of the prior art and therefore causes less straining of the machine. There are two conditions inherent in the use of the single crank which have a detrimental effect upon the indexing action of the carrier, namely, (1) the point of contact between the crank pin and the carrier approaches and recedes from the center of the carrier, and (2) the velocity imparted to the carrier increases and decreases respectively with the first condition. If the radius of the carrier were of infinite length, it is clear that the movement of the carrier by the constant velocity single crank would be one of simple harmonic motion. However, since the radius of the carrier is not of infinite length, the two conditions enumerated have an additive effect which materially disturbs the motion imparted to the carrier. The first of the above conditions is also inherent in the double crank indexing mechanism I of this invention. However, by selecting that portion of the movement of crank pin 76 on each side of its minimum velocity position Y (Fig. 4), to index the carrier C, it is apparent that the angular velocity of the crank arm 77 decreases and increases respectively as the crank pin 76 approaches and recedes from the center of the carrier C. This condition tends at least to eliminate the detrimental effect of the pin 76 approaching and receding from the center of the carrier C with the result that a smoother indexing of the carrier is provided.

Referring to Fig. 1, the carrier C is adapted to be rigidly held in a fixed position between successive indexing movements by the locking pin L. The locking pin L is adapted to be vertically reciprocated into and out of engagement with a lug 88 on the carrier C by a cam 86 fixed to the arm 80 of the indexing mechanism I. Inasmuch as the cam 86 rotates with the crank shaft 79, its setting may be arranged to time the release of the carrier C with the indexing movement of the crank pin 76 to maintain a proper sequence of operation between the locking pin L and the indexing of the carrier C.

The shaft K, which drives the crank pin 76, must accelerate the carrier C during the first half, and decelerate said carrier during the last half of an indexing movement. Since the shaft K is driven by the motor M through the positive clutch P, and the clutch includes slots 44 that are much longer than the width of the plunger 51, means must be provided to eliminate the back lash between the slots 44 and plunger 51.

Referring again to Figs. 7 and 8, the arm 52 of the bracket 49 is bored to receive a radially reciprocable plunger 89 that is resiliently urged outwardly by a compression spring 90. The plunger 89 is provided with a head portion having an inclined surface 91 that is adapted to engage the leading end of the slots 44. A camming pin 92 is fixed in the head of drum 57 and extends downwardly through an elongated slot 93 in arm 52 which slot overlies the bore in which plunger 89 reciprocates. The plunger 89 and pin 92 are provided with cooperating cam surfaces 94 which coact to retract the plunger 89 from within slot 44 upon relative movement in one direction between the drum 57 and the bracket 49.

In the position shown in Figs. 7 and 8, the element 42 is driving the shaft K through the drum 57, the bracket 49, and the plungers 51 and 89. The connection has no lost motion or back lash and consequently acceleration and deceleration of the carrier C will be instantly accomplished. Upon moving a plunger 37 into the path of lugs 61 on the drum 57, the drum is stopped. However, the bracket 49 continues to rotate in a counter clockwise direction causing the plunger 89 to move relatively to the pin 92 and camming the plunger 89 from within slot 44. Upon subsequently releasing drum 57, and by virtue of the slot 93 in arm 52, the contraction of spring 60 effects relative movement between the drum 57 and the bracket 49, causing sliding of the camming surfaces 94 and permitting the spring 90 to move the plunger 89 outwardly.

During the indexing of carrier C, its velocity is increased to a maximum during the first half of the indexing movement. The kinetic energy of the carrier due to this maximum velocity is substantial, especially when heavy work is mounted on the spindles J. The absorption of this kinetic energy by the indexing mechanism I and shaft K places an unreasonable strain on the machine causing distortion of parts and slamming of the carrier with the locking pin L. In the present invention, means has been provided for braking the movement of the carrier only after it has attained its maximum velocity, and only until the indexing movement of the carrier has been substantially completed. Referring to Figs. 2 and 3, a portion of the arm 80 of the indexing mechanism I forms a braking surface 95 about which a brake band 96 is positioned. One end of the brake band 96 is connected to the sidewall of the base D, and the other end is connected by a pin 97 to a lever 98 pivoted to the sidewall of the base D. The free end of the pivoted lever 98 is provided with a cam follower 99 adapted to follow a cam 100 fixed on the crank shaft 79. The cam 100 is positioned on the crank shaft 79 so that it moves lever 98 to render the brake band 96 effective only after the carrier C has attained its maximum velocity. The brake band 96 is released upon completion of the indexing movement.

Although the various features of the improved machine tool have been shown and described in detail to fully disclose one embodiment of this invention, it will be evident that numerous changes may be made in such details, and certain features may be used without others, without departing from the principles of the invention.

What is claimed is:

1. A machine tool comprising in combination a work-supporting carrier; means for feeding a tool support relative to said carrier; means for successively indexing said carrier about its central axis including a member adapted to be rotated at a variable speed through a single revolution during each indexing movement; means operable independently of the operation of said tool support feeding means for rotating said member; and means on said carrier adapted to be engaged by said member for indexing said carrier during the slow speed portion of the variable speed cycle of said member.

2. A machine tool as claimed in claim 1, in which said member is driven at a variable speed through each revolution and said member contacts means on said carrier at varying distances from the central axis of said carrier.

3. A machine tool comprising in combination, a work-supporting carrier; means for feeding a tool support relative to said carrier; means for successively indexing said carrier about its central axis including a member adapted to be rotated at a variable speed during a single revolution for each indexing movement; means operable independently of the operation of said tool support feeding means for rotating said member; and means on said carrier adapted to be contacted by said member for a relatively short time interval before and after said member reaches its minimum speed.

4. A machine tool as claimed in claim 3, in which said member contacts the means on said carrier successively at decreasing distances from said central axis and subsequently at successively increasing distances from said central axis.

5. A machine tool as claimed in claim 3, in which the point of contact between said member and the means on said carrier approaches and recedes from the center of said carrier; and the speed of said member decreases as said point of contact approaches the center of said carrier, and increases as said point recedes from the center of said carrier.

6. A machine tool as claimed in claim 3, in which said member is operated by a driving member adapted to be rotated at substantially a constant speed.

7. A machine tool comprising in combination a base; a standard; a carrier journaled on said standard and adapted to be periodically indexed about said standard; a plurality of work-supporting spindles mounted on said carrier; means for positively driving said spindles; means for indexing said carrier; means for changing the drive between the spindles and said positive drive; means for operating said drive changing means at a speed to change said drive within substantially a minimum time interval; and means for operating said indexing means in a definite timed relation with that of the change drive mechanism, but at a relatively slower speed.

8. A machine tool as claimed in claim 7, in which said indexing means includes a rotatable crank pin, and said change-drive means is operated by rotatable cam means; a common shaft adapted to be rotated at substantially a constant speed for rotating said cam means and said crank pin in a definite timed relation during each revolution of said shaft; and means between said shaft and said crank pin for rotating said crank pin at a slower rate of speed during at least a portion of the rotation of said shaft than the speed at which said cam means is rotated.

9. A machine tool comprising in combination, a carrier; a plurality of work-supporting spindles mounted on said carrier and disposed about its central axis; means for driving said spindles; means for disengaging said driving means from and for engaging said driving means with said spindles; means for indexing said carrier about its central axis while said driving means is disengaged from said spindles including a member adapted to be rotated at a variable speed through a single revolution during each indexing movement.

10. A machine tool comprising in combination, a carrier; a plurality of work-supporting spindles mounted on said carrier and disposed about its central axis; means for driving said spindles; means for disengaging said spindles from and for engaging said spindles with said driving means; means for periodically indexing said carrier about its central axis including a member adapted to be rotated at a variable speed through a single revolution during each indexing movement; and common means for controlling the disengagement and engagement of the spindles with the driving means and for operating said indexing means.

11. A machine tool as claimed in claim 10 in which said common means includes a shaft adapted to be rotated through a single revolution during each indexing movement, and in which said shaft is rotated at a speed sufficient to disengage said spindles from and to engage said spindles with said driving means within substantially a minimum time interval; and means between said shaft and said indexing means for decreasing the speed at which said shaft drives said indexing means.

12. A machine tool comprising in combination, a carrier; a plurality of work-supporting spindles mounted on said carrier and disposed about its central axis; means for positively driving said spindles; means for disengaging said positive driving means from, and for engaging said positive driving means with said spindles; means for indexing said carrier about its central axis while said positive driving means is disengaged from said spindles including a member adapted to be rotated at a variable speed through a single revolution during each indexing movement; and means for synchronizing the speed of said spindles with that of said positive driving means prior to re-engagement of said positive driving means with said spindles.

13. A machine tool as claimed in claim 12, in which the indexing of said carrier occurs during the low-velocity portion, and the synchronizing of said spindles occurs during the high velocity portion of the cycle of revolution of said member.

14. A machine tool comprising, in combination, a standard; a carrier surrounding said standard and provided with a plurality of work-supporting spindles spaced about the central axis of said carrier; means for driving said spindles; means for engaging and disengaging a positive and an impositive drive between said spindles and said spindle driving means, whereby the speed of said spindles may be synchronized with the speed of said positive drive before said positive drive is engaged with said spindles; means for indexing said carrier about said standard after disengaging said positive and before engaging said impositive drive with said spindles; a common shaft for controlling the synchronizing of the speed of said spindles with that of said positive drive and for driving said indexing means; means for driving said common shaft at a speed to effect said synchronizing within substantially a minimum time interval; and means between said common shaft and said indexing means for decreasing the speed at which said common shaft drives said indexing means during at least a portion of the revolution of said common shaft.

15. A machine tool as claimed in claim 9, in which said indexing means comprises a member adapted to be rotated at a variable speed through a single revolution during each indexing movement, and in which said member contacts means on said carrier for moving it through an indexing movement.

16. A machine tool as claimed in claim 9, in which said indexing means comprises a member adapted to be rotated at a variable speed through a single revolution during each indexing movement and in which said member contacts means on said carrier at varying distances from its central axis.

17. A machine tool as claimed in claim 9, in which said indexing means comprises a member adapted to be rotated from a maximum through a minimum to a maximum speed through a single revolution during each indexing movement; and in which said member contacts means on said carrier for a relatively short time interval before and after said member reaches its minimum speed.

18. A machine tool as claimed in claim 9, in which the indexing means comprises a crank and the means between said common shaft and said crank comprises an additional crank having an arm of variable effective length.

19. A machine tool as claimed in claim 9, in which the indexing means comprises a crank, and the means between said common shaft and said crank comprises an additional crank, said additional crank being adapted to form a crosshead connection with a member adapted to be rotated at a constant velocity.

20. A machine tool comprising, in combination, a work-supporting carrier; means adapted periodically to index said carrier about its central axis through a predetermined angle from rest through a maximum velocity to rest; and means adapted to brake said carrier only after said carrier has attained its maximum velocity, and only until said carrier has substantially returned to rest.

21. A machine tool as claimed in claim 20, in which said indexing means comprises a member adapted to be rotated at a variable speed through a single revolution during each indexing movement, and in which said brake means acts upon said indexing means.

22. A machine tool comprising, in combination, a standard; a work-supporting carrier encircling said standard; means for periodically indexing said carrier about its central axis from rest through a maximum velocity to rest; a normally stationary indexing shaft adapted periodically to be rotated through a single revolution when said carrier is to be indexed; a positive-action clutch element journaled on said indexing shaft and having a plurality of slots disposed about its periphery; means adapted to drive said clutch element at substantially a constant rotative speed; a mechanically-operated reciprocable plunger connected to said normally stationary indexing shaft and adapted to be moved into and withdrawn from engagement with walls of the slots in said clutch element, said slots being substantially greater in length than the width of said plunger; and means between said indexing shaft and said positive clutch for eliminating the back-lash between said plunger and the relatively long slots.

23. A machine tool as claimed in claim 22, in which the back-lash eliminating means comprises a resiliently urged plunger connected to said indexing shaft and adapted to engage the walls of said slots opposite those which said mechanically-operated plunger engages.

24. A machine tool as claimed in claim 22, in which said indexing means is adapted to move said carrier throughout its indexing movement; and brake means adapted to be applied to said indexing means only after said carrier has attained its maximum velocity and only until said carrier has returned substantially to rest.

25. A machine tool comprising, in combination, a standard adapted to support a plurality of tool heads about its central longitudinal axis; a carrier encircling said standard; a plurality of work-supporting spindles mounted on said carrier and spaced about its central axis; means for driving said spindles; means for engaging and disengaging a positive and an impositive drive between said spindles and said spindle driving means, whereby the speed of said spindles may be synchronized with the speed of said positive drive before said positive drive is engaged with said spindles; means for periodically indexing said carrier through a predetermined number of degrees about its central axis comprising a member adapted to be rotated at a variable speed through a single revolution during each indexing movement; a common shaft adapted to be rotated through a single revolution for controlling the synchronizing of the speed of said positive drive and for driving said spindles with that of said positive drive and for driving said indexing means; means for periodically driving said common shaft for a single revolution at a speed to effect said synchronizing within substantially a minimum time interval, said means comprising a positive-action clutch; means between said common shaft and said indexing means for decreasing the speed at which said shaft drives said indexing means during at least a portion of the revolution of said shaft; and means adapted to brake said carrier only after said carrier has attained a maximum velocity during an indexing movement, and only until said carrier has substantially returned to rest.

26. Indexing apparatus for machine tools comprising an indexing member adapted periodically to be moved about a closed path; means for moving said indexing member at a variable speed through each of its cycles, said means comprising a driving member mounted on one shaft, a driven member mounted on a separate spaced shaft, and a cross-head connection between said driving and driven members.

27. Indexing apparatus for machine tools comprising a crank pin adapted to be moved about a closed path; means connecting said pin to a rotatable shaft; and means for driving said shaft at a variable speed throughout each of its revolutions comprising a rotatable member mounted on a separate spaced shaft, and a cross-head connection between said rotatable member and said rotatable shaft.

28. Indexing apparatus for machine tools comprising a crank pin adapted to be moved about a closed path; means for driving said pin at a variable speed throughout said path, said driving means comprising a pair of crank arms mounted on one shaft, one of said arms forming a crosshead connection with a rotatable member mounted on a separate spaced shaft and adapted to be rotated at a substantially constant speed.

29. In a machine tool, a shaft adapted to be rotated periodically; cooperating positive-action clutch elements mounted on said shaft; one of said elements being journaled on and the other being fixed to said shaft; means for rotating the element that is journaled on said shaft; one of said elements being provided with a plunger, and the other including a plurality of circumferentially disposed slots of greater length than the width of said plunger; means for periodically inserting said plunger into one of said slots; and means for eliminating the back lash between said slot and plunger.

30. In a machine tool, a shaft adapted to be rotated periodically; a positive-action clutch element journaled on said shaft; means for rotating said element; a cooperating clutch element fixed to said shaft; one of said elements being provided with a plurality of plungers, and the other element being provided with a plurality of circumferentially disposed slots of greater length than the width of said plungers; and means for periodically inserting said plungers within said slots so that one engages the leading, and the other engages the trailing wall of certain of said slots.

EDWARD P. BULLARD, III.